United States Patent
Van Vlassenrode et al.

(10) Patent No.: US 10,821,714 B2
(45) Date of Patent: Nov. 3, 2020

(54) METHOD FOR MANUFACTURING A PANEL INCLUDING A REINFORCEMENT SHEET, AND A FLOOR PANEL

(71) Applicant: IVC N.V., Avelgem (BE)

(72) Inventors: Kristof Van Vlassenrode, Deinze (BE); Filip Gilbert Lucien Bossuyt, Avelgem (BE)

(73) Assignee: IVC B.V., Avelgem (BE)

( * ) Notice: Subject to any disclaimer, the term of this patent is extended or adjusted under 35 U.S.C. 154(b) by 55 days.

(21) Appl. No.: 14/549,153

(22) Filed: Nov. 20, 2014

(65) Prior Publication Data

US 2016/0144606 A1 May 26, 2016

(51) Int. Cl.
*B29C 43/24* (2006.01)
*B29C 43/26* (2006.01)
(Continued)

(52) U.S. Cl.
CPC ............. *B32B 37/04* (2013.01); *B29C 43/24* (2013.01); *B29C 43/265* (2013.01); *B29C 43/46* (2013.01);
(Continued)

(58) Field of Classification Search
CPC ..... B32B 37/04; B32B 37/24; B32B 37/1027; B32B 37/153; B32B 37/156; B32B 5/16;
(Continued)

(56) References Cited

U.S. PATENT DOCUMENTS

| 4,185,133 A | 1/1980 | Woerner |
| 4,464,432 A * | 8/1984 | Dost ..................... B29B 15/122 |
| | | 427/246 |

(Continued)

FOREIGN PATENT DOCUMENTS

| EP | 1847385 A1 | 10/2007 |
| EP | 2269814 A1 | 1/2011 |

(Continued)

OTHER PUBLICATIONS

International Search Report and Written Opinion dated Mar. 1, 2016 for corresponding International Application No. PCT/EP2015/077063, filed Nov. 19, 2015.

(Continued)

*Primary Examiner* — Michael A Tolin
(74) *Attorney, Agent, or Firm* — Bacon & Thomas, PLLC

(57) ABSTRACT

A method for manufacturing a panel including a reinforcement sheet comprises the steps of: providing a first layer of thermoplastic material, providing a reinforcement sheet, laying the reinforcement sheet and the first layer onto each other, applying a second layer of thermoplastic material on top of the reinforcement sheet at a side facing away from the first layer, at least partially melting the thermoplastic materials of the first layer and the second layer, adhering the at least partially melted first layer, the at least partially melted second layer and the reinforcement sheet to each other so as to form the panel, wherein the reinforcement sheet and the first layer are adhered to each other by pressing them together after at least partially melting the thermoplastic material of the first layer, but before applying the second layer of thermoplastic material onto the reinforcement sheet.

15 Claims, 1 Drawing Sheet

(51) Int. Cl.
| | |
|---|---|
| *B29C 43/46* | (2006.01) |
| *B29C 43/48* | (2006.01) |
| *B32B 27/12* | (2006.01) |
| *B32B 27/20* | (2006.01) |
| *B32B 27/30* | (2006.01) |
| *B32B 37/02* | (2006.01) |
| *B32B 37/04* | (2006.01) |
| *B32B 37/10* | (2006.01) |
| *B32B 37/24* | (2006.01) |
| *B32B 38/08* | (2006.01) |
| *B29C 70/50* | (2006.01) |
| *E04F 15/10* | (2006.01) |
| *B32B 37/00* | (2006.01) |
| *B32B 37/14* | (2006.01) |
| *B29L 7/00* | (2006.01) |
| *B29L 9/00* | (2006.01) |

(52) U.S. Cl.
CPC ........... *B29C 70/506* (2013.01); *B32B 27/12* (2013.01); *B32B 27/20* (2013.01); *B32B 27/304* (2013.01); *B32B 37/02* (2013.01); *B32B 37/10* (2013.01); *B32B 37/142* (2013.01); *B32B 37/156* (2013.01); *B32B 37/24* (2013.01); *E04F 15/105* (2013.01); *E04F 15/107* (2013.01); *B29C 2043/483* (2013.01); *B29L 2007/002* (2013.01); *B29L 2009/00* (2013.01); *B32B 37/1027* (2013.01); *B32B 38/08* (2013.01); *B32B 2260/021* (2013.01); *B32B 2260/046* (2013.01); *B32B 2262/101* (2013.01); *B32B 2307/58* (2013.01); *B32B 2307/718* (2013.01); *B32B 2307/734* (2013.01); *B32B 2309/14* (2013.01); *B32B 2327/06* (2013.01); *B32B 2419/04* (2013.01); *B32B 2471/00* (2013.01)

(58) Field of Classification Search
CPC ........... B32B 5/30; B32B 27/08; B32B 27/12; B32B 27/14; B32B 27/20; B32B 27/304; B32B 37/02; B32B 37/06; B32B 37/08; B32B 37/10; B32B 38/08; B32B 2260/021; B32B 2260/046; B32B 2262/101; B32B 2419/04; B32B 2471/00; B29C 43/228; B29C 43/265; B29C 43/305; B29C 43/24; B29C 43/26; B29C 43/28; B29C 43/46; B29C 43/48; B29C 2043/483; B29C 70/504; B29C 70/506; E04F 15/10; E04F 15/105; E04F 15/107
See application file for complete search history.

(56) References Cited

U.S. PATENT DOCUMENTS

| | | | |
|---|---|---|---|
| 4,514,258 A | 4/1985 | Hammarberg | |
| 4,678,528 A * | 7/1987 | Smith | B32B 38/0036 156/220 |
| 6,139,942 A | 10/2000 | Hartness | |
| 6,217,700 B1 | 4/2001 | Knobel | |
| 6,379,786 B1 | 4/2002 | Takeshita et al. | |
| 6,444,075 B1 * | 9/2002 | Schneider | B32B 3/00 156/242 |
| 8,679,991 B2 | 3/2014 | Goto | |
| 8,956,714 B2 | 2/2015 | Vermeulen | |
| 2004/0242095 A1 | 12/2004 | Prakash | |
| 2004/0242096 A1 | 12/2004 | Prakash | |
| 2005/0087487 A1 * | 4/2005 | Sakamoto | B01D 67/002 210/500.36 |
| 2006/0151100 A1 * | 7/2006 | Young, III | B32B 37/24 156/276 |
| 2007/0166516 A1 | 7/2007 | Kim | |
| 2009/0197036 A1 | 8/2009 | Hwang et al. | |
| 2010/0055420 A1 | 3/2010 | Vermeulen | |
| 2010/0310838 A1 | 12/2010 | Ketzer et al. | |
| 2011/0300392 A1 * | 12/2011 | Vermeulen | E04F 15/02 428/513 |
| 2012/0196098 A1 * | 8/2012 | Duyck | B32B 37/02 428/201 |
| 2013/0183506 A1 | 7/2013 | Vermeulen | |
| 2015/0047774 A1 * | 2/2015 | Getschel | B32B 5/18 156/244.11 |
| 2015/0121793 A1 * | 5/2015 | Segaert | B29C 70/081 52/506.01 |
| 2015/0167319 A1 * | 6/2015 | Segaert | B29C 70/081 428/203 |
| 2015/0176291 A1 * | 6/2015 | Laukhuff | E04F 15/163 428/76 |

FOREIGN PATENT DOCUMENTS

| | | |
|---|---|---|
| EP | 2402155 A1 | 1/2012 |
| WO | 9926773 A1 | 6/1999 |
| WO | 2007086632 A1 | 8/2007 |
| WO | 2008122668 A1 | 10/2008 |
| WO | 2013179260 A1 | 12/2013 |
| WO | 2013179261 | 12/2013 |

OTHER PUBLICATIONS

Teischinger, Alfred: "Holz-Kunststoff-Verbundwerkstoffe (WPC)-Moglichkeiten und Grenzen einer neuen Werkstoffgeneration", Schweiz. Z.Forstew., vol. 156, No. 11, 2005, pp. 416-419, XP002606106.
Klysov, A.A.: "Wood-Plastic composites", 2007, Wiley-Interscience, New York (US, XP002606107, ISBN: 978-0-470-14891-4), pp. 26-28.

* cited by examiner

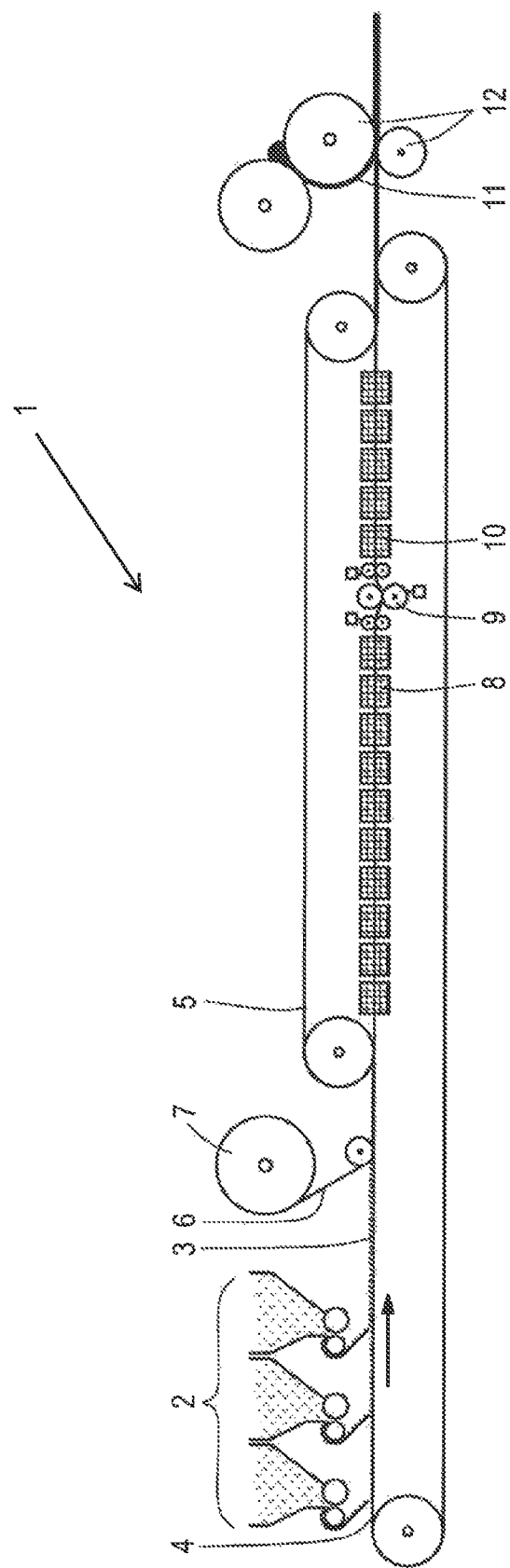

METHOD FOR MANUFACTURING A PANEL INCLUDING A REINFORCEMENT SHEET, AND A FLOOR PANEL

BACKGROUND

The discussion below is merely provided for general background information and is not intended to be used as an aid in determining the scope of the claimed subject matter.

An aspect of this disclosure relates to a method for manufacturing a panel, such as a floor panel, including a reinforcement sheet, comprising the steps of providing a first layer of thermoplastic material, providing a reinforcement sheet, laying the reinforcement sheet and the first layer onto each other, applying a second layer of thermoplastic material onto the reinforcement sheet at a side facing away from the first layer, at least partially melting the thermoplastic materials of the first layer and the second layer, and adhering the at least partially melted first layer, the at least partially melted second layer and the reinforcement sheet to each other so as to form the panel.

Such a method is known in the field of plastic floor products including a reinforcement sheet.

A typical method for producing (mainly plastic) modular floor products includes calandering and laminating techniques. According to this method several continuous sheet or foil shaped layers are produced by calandering, after which these layers are laminated together using a continuous laminating process. In this laminating process several layers are consecutively added, starting with one or more substrate layers, including a balance sheet, and on which a printed layer is added, followed by a transparent layer. This is done in one single production process with a series of laminating nip rolls, where upfront each laminating roll a new layer is unwound from a roll, preheated and pressed on the previously laminated layers.

It is also described to add a glass fiber based web in the product. This glass fiber web can be a non woven, a grid, or a scrim (combination of non woven and grid) and gives an excellent dimensional stability to the product.

The glass fiber can be added in the laminating line, where it is adhered to a previous calandered layer, after which another calandered layer is added on top of this complex, after which further layers can be added. The glass fiber web can be added in an untreated form, but can also be pretreated in an offline step with a coating, in order to assure a better connection. In an alternative offline step the glass fiber web can be impregnated on a calandering line, where in one step a calandered layer is produced from a molten thermoplastic material, on which the glass fiber web is immediately added, in a laminating nip roll. This intermediate complex can then be combined with the other necessary layers on a laminating line.

An important process step in the known production steps is sufficient impregnation of the glass fiber web at high line speeds. In these continuous processes contact time at the nip roll, in which the glass fiber web and plastic layer are laminated and/or impregnated, is so short that there is a risk the impregnation is not done properly, leading to delamination of the layers from the glass fiber web in the finished product during further converting steps or during use of the product. One way to overcome this is to pre-impregnate the fiber with a coating. This however increases the cost of the final product, requires an extra offline operation, and can also change the final properties of the product like bending stiffness.

Another method for producing modular floor products includes spreading a granulate of a thermoplastic material on an endless belt, which makes part of a double belt press. A glass fiber layer is applied on this spread layer. Another granulate layer thermoplastic material is spread on top of the glass fiber layer, wherein in a subsequent step both layers, including the glass fiber layer are compressed in the double belt press. The belts also assure melting of the thermoplastic material due to heating energy supplied through a lower and upper belt, and impregnating the glass fiber layer, in order to obtain a glass fiber reinforced continuous plastic slab, typically to be finished to floor panels.

Also in this method the glass fiber gives a good dimensional stability to the finished product.

The problem of an impregnation process of the glass fiber is partially overcome, since contact time between plastic material and glass fiber is longer, so that impregnation can be assured. A drawback of this system however is a possible damaging of the glass fiber. Due to the embedding of the glass fiber between two layers of granulate, and the compression in a double belt press, individual granulates can locally deform the fiber or even perforate it. A careful balance needs to be found between melting, and pressure in the press. Due to this the double belt process is not at all flexible to perform a rapid changeover in product thickness, glass fiber type, formulations, or the like. A way to partially overcome the problem of deformation, or perforation of the glass fiber, is to use very fine granulate (microgranulate), typically to be made in a pelletizing extruder. The production of these micropellets is also difficult, since output decreases when decreasing the pellet diameter, leading to higher investment for the extruders. When the pressure becomes too high, there is more chance on burnt material.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention is a method that includes adhering the reinforcement sheet and the first layer to each other by pressing them together after at least partially melting the thermoplastic material of the first layer, but before applying the second layer of thermoplastic material onto the reinforcement sheet.

This means that during the step of pressing the risk of deformation of the reinforcement sheet by, for example, individual granulates in the first layer is minimized, since the second layer is not present yet. Particularly, if the second layer was present and softened due to at least partially melting it, the reinforcement sheet could be deformed and/or damaged during pressing due to granulates of the first layer that are not yet softened enough. In the method, the reinforcement sheet and the first layer are pressed together before applying the second layer, which means that the reinforcement sheet can be supported directly by a rigid press element, such as a press plate or a press belt, which minimizes the risk of deformation and/or damage of the reinforcement sheet.

The resulting product may be further treated to obtain a flooring product having a thickness which is typically within a range of 1.5-6.5 mm, and preferably between 2 mm and 5 mm.

The first layer, situated at the backing of the finished product, and with the reinforcement sheet typically positioned in the middle of the product, will finally be in the range of 1-2.5 mm. For reasons of avoiding upward curling of the resulting product, the reinforcement sheet can also be positioned in another height position than in the middle of the final product. For example, its position may be located such that the product is naturally bent upwardly to a limited extent, but due to its own weight, it will lay flat on the ground. In this way it is assured that there will be no upstanding edges, which is not desired by the customer. When the reinforcement sheet is positioned higher, the thickness of the first layer can typically be between 1.25 and 3.5 mm after pressing.

It is noted that the first layer and the second layer are attached to the reinforcement sheet through adhering properties of the respective melted thermoplastic materials.

In a practical embodiment, the first layer of thermoplastic material is provided in the form of granulates which are spread and subsequently at least partially melted and/or the second layer of thermoplastic material is provided in the form of granulates which are spread and subsequently at least partially melted.

In a specific embodiment the first layer of thermoplastic material is provided in the form of granulates which are spread and subsequently at least partially melted and the second layer of thermoplastic material is provided in the form of a sheet or film. The sheet or film may be pressed separately, for example from granulates, and may still be at least partially melted before applying it onto the reinforcement sheet.

The first layer and the second layer are adhered to the reinforcement sheet upon bringing them in close contact to each other. The first layer and the reinforcement layer are pressed to each other, but in a next step the second layer may be brought in close contact to the reinforcement layer without pressure or at a pressure which is lower than the pressure that is applied for pressing the first layer and the reinforcement layer to each other.

A typical thermoplastic granulate is made of flexible or semirigid polyvinyl chloride (PVC), but can also be rigid PVC. Other possible polymers are polyolefines like polypropylene, polyurethane, rubber based compounds, elastomers, or mixtures of polymers like elastomer and polypropylene, or wood plastic composites, being mixtures including wood flour or particles and polymer.

The first layer of thermoplastic material may be made of semi rigid PVC containing at least 35% of inorganic fillers.

It has been demonstrated by the inventors that for the whole thickness range described above, more specific also for a relatively thin layer of 1 mm, it is possible to use a standard granulate size with a granulate diameter of 3.2 mm. When using this standard granulate diameter of 3.2 mm, the best result of evenly pressed surface with very narrow thickness tolerances of the pressed layer, was given by adjusting the length of the granules to 0.5 mm, creating a short cylindrical shape. The short cylindrical shape is not putting constraints to the production of the granulate. It only needs a faster cutting speed at the extruder head, where the melt is extruded through a perforated plate. The typical size of 3.2 mm is a standard in the thermoplastic industry, and allows to run the extrusion process at high outputs, without creating high back pressures. High back pressures easily create burning of shear sensitive materials like PVC, due to which output then would need to be decreased, leading to higher production or investment costs.

Preferably, the method is performed as a continuous process, resulting in a continuous sheet which can be cut into panels of any desired size afterwards. The panels may then be further provided with coupling means for coupling panels to each other so as to form a covering. For example, edges of the panels may be provided with tongues and grooves.

The reinforcement sheet and the first layer may be pressed together by means of a double belt press. This creates an even force distribution of the reinforcement sheet on the first layer.

It has in particular been found by the inventors that by applying the reinforcement sheet on top of the spread first layer, the upper belt protects the reinforcement sheet against deformation or perforation through the granulate, no matter what pressure is used. Hence even at high pressures, and even when the granulate is not reaching the temperature at which it becomes completely thermoplastic so that it can be shaped, the reinforcement sheet will remain intact.

It has been shown to be an advantage of this particular process of spreading a layer and compressing this layer with the reinforcement sheet backed up by the upper belt of the double belt process, to be able to run with the standard granulate diameter of 3.2 mm, and not needing smaller granulate or microgranulate.

The granulates may have a cylindrical shape with a cylinder diameter in the range of 2.5-3.5 mm and a cylinder height in the range of 0.2-2.0 mm. A height of about 0.5 mm is preferred.

Additional layers may be applied on the first layer and the second layer, such as a backing layer on the first layer, and a printed decoration layer on the second layer, possibly covered with a protection layer. This may be accomplished by a laminating or coating process.

Additional steps may be included, such as embossing of top and/or bottom side of the laminated complex, applying a UV lacquer on the top side, and cutting this material in slabs for further converting to finished modular floor elements.

The second layer of at least partially melted thermoplastic material on the reinforcement sheet may be pressed onto the reinforcement sheet by means of calandering. This is a relatively simple process.

A particular advantage of the calandering process, is that the calandered second layer is levelling the thickness of the obtained product. A levelling is often needed because the mechanical tolerances of the double belt press are limited to 0.1 mm. A typical prior art levelling operation is done by sanding the pressed surface. For this sanding operation the substrate needs to be cooled. This however is complicated, requesting for extra space, investment, and energy cost, since the product coming out of the press needs to be cooled to a temperature at which it can be sanded. This is undesired, however, since it needs to be heated up again when a decorative layer and/or protective layer need to be applied.

The calandering process may be performed by a calandering device which comprises more than two calandering rolls, for example between two and five calandering rolls.

The second thermoplastic layer, applied with a calander on the above described complex of pressed granulates and reinforcement sheet, is typically flexible or semi-rigid polyvinyl chloride (PVC), but can also be rigid PVC. Other possible polymers are polyolefines like polypropylene, polyurethane, rubber based compounds, elastomers, or mixtures of polymers like elastomer and polypropylene, or wood plastic composites, being mixtures including wood flour or particles and polymer.

The thermoplastic material of the first layer and the second layer may be the same, or can be based on the same polymer, but having a different recipe, or can be based on a different thermoplastic material.

The reinforcement sheet may comprise a glass fibre foil, preferably having a weight of 25-70 g/m2.

The inventors have found that a variety of glass fibers can be used in this method with good result. In general higher weight fibers lead to lower permeability, hence more difficult impregnation and process stability, but better dimensional stability. In the state of the art laminating or pressing methods, applying a big part of this range of glass fibers leads to bad impregnation results and/or difficult product changeovers between thin and thick products. With the method described herein, glass fibers could be used between 25 and 70 gram per square meter with very good results.

High production speeds could be obtained, with fast and drastic product changeovers between total product thicknesses of 1.5 and 5 mm.

It is advantageous when during the step of pressing the reinforcement sheet and the first layer to each other, the reinforcement sheet is impregnated by the thermoplastic material of the first layer over at least 80% of its thickness. This can be controlled by selecting at least an appropriate pressure and temperature during the pressing step. Additionally, residence time in a press may influence the rate of impregnation.

Another aspect of the invention is also related to a floor panel, which is made according to the method as described hereinbefore. Other panels for alternative use are conceivable, such as panels for inside or outside use, for wall covering, ceiling covering, or the like.

BRIEF DESCRIPTION OF THE DRAWING

Hereinafter aspects of the invention will be elucidated with reference to a very schematic drawing showing an embodiment of the invention by way of example.

FIG. 1 is an illustrative side view of an apparatus for performing an embodiment of the method for manufacturing a panel

DETALIED DESCRIPTION OF THE ILLUSTRATIVE EMBODIMENT

FIG. 1 shows a part of an apparatus 1 for continuously processing a web and illustrates some steps of an embodiment of a method for manufacturing a panel including a reinforcement sheet. The apparatus 1 includes a granulate supply 2 which is configured to supply a first layer or base layer 3 of granulate on a supporting lower conveyor belt 4. The lower conveyor belt 4 is an endless belt. The granulate is spread evenly on the lower conveyor belt 4. The granulate is made from a thermoplastic material, for example flexible PVC.

The lower conveyor belt 4 has a greater length than a second, upper endless conveyor belt 5 which is positioned at a distance downstream of the granulate supply 2 and runs along a part of the lower conveyor belt 4. At the upper portion of the lower conveyor belt 4, both conveyor belts 4, 5 run in the same manufacturing direction, in FIG. 1 from left to right as indicated by an arrow at the lower conveyor belt 4.

There is supplied a reinforcement sheet 6 on top of the base layer 3 of granulate. The reinforcement sheet 6 may be a glass fiber foil or any alternative foil which has reinforcement properties. The reinforcement sheet 6 is supplied by unwinding it from a supply roll 7. Subsequently, the reinforcement sheet 6 and the base layer 3 of granulate are transported between the lower and upper conveyor belts 4, 5 along a heating device 8 in order to melt the base layer 3 of granulates, and then pressed together by a pressing unit 9. The rate of melting may be such that the granulates are fully converted into a pasty substance, but it is also conceivable that the granulates are partially melted. The reinforcement sheet 6 and the base layer 3 are attached to each other under pressure through adhering properties of the melted thermoplastic material. Subsequently, the base layer 3, including the reinforcement sheet 6, are transported along a cooling unit 10. It is advantageous that the reinforcement sheet 6 is directly supported by a rigid press element of the pressing unit 9, since a soft layer between the reinforcement sheet 6 and the rigid press element would increase the risk of deformation or damage of the reinforcement sheet 6 by granulates of the first layer 3 that are not fully melted. It provides the opportunity to apply relative large granulates in the base layer 3.

In a next step a second layer or top layer 11 is provided on top of the reinforcement sheet 6. The top layer 11 is made from the same thermoplastic material as the base layer 3, but this may be different in an alternative embodiment. The thermoplastic material of the top layer 11 is melted and pressed into a sheet by nip rollers, and the still at least partially melted sheet 11 and the base layer 3 including the reinforcement sheet 6 are then pressed together by means of calandering rolls 12, resulting in a web having a smooth upper surface.

At a position downstream of the calandering rolls 12 there may be arranged a cutting mechanism (not shown) to cut the resulting continuous web into separate panels which are then collected for further processing.

In an alternative embodiment (not illustrated) the reinforcement sheet may be placed on top of a lower press plate or press member in a first step, after which thermoplastic granulates are spread over the reinforcement sheet to form the first layer. The granulates may be at least partially melted before or after spreading. Subsequently an upper press plate or press member is placed on top of the first layer and the lower and upper press plates or press members can press the first layer and the reinforcement sheet to each other. The resulting intermediate product may be turned upside down and the second layer of thermoplastic material, for example an at least partially melted sheet, can be applied on top of the reinforcement sheet at its side facing away from the first layer. In case of placing an at least partially melted sheet on top of the reinforcement sheet, this can be fixed thereto by means of calandering. It is also possible that the resulting intermediate product is not turned upside down and that that second layer is applied onto the reinforcement sheet when the reinforcement sheet extends below the first layer.

From the foregoing, it will be clear that the invention provides an improved method for manufacturing a panel including a reinforcement sheet.

The invention is not limited to the embodiment shown in the drawing and described hereinbefore, which may be varied in different manners within the scope of the claims and their technical equivalents. For example, the first layer may be applied on the lower conveyor belt in melted condition instead of first spreading and then melting the granulates. Furthermore, heating of the granulates of the first layer may be performed before laying the reinforcement sheet and the first layer onto each other.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A method for manufacturing a panel including a reinforcement sheet, comprising:
   providing a first layer of thermoplastic material in the form of granules;
   providing a reinforcement sheet having a thickness;
   combining the reinforcement sheet and the first layer by laying the reinforcement sheet on the first layer, or alternatively, by performing the step of providing the first layer of thermoplastic material by applying the thermoplastic material of the first layer onto the reinforcement sheet;
   after the step of combining the reinforcement sheet and the first layer, at least partially melting the first layer of thermoplastic material in a double belt press and pressing the at least partially melted first layer of thermoplastic material and the reinforcement sheet together at a first pressure to adhere the reinforcement sheet and the first layer to each other, wherein the reinforcement sheet directly engages a press element during the step of pressing at the first pressure;
   after adhering the reinforcement sheet and the first layer to each other,
   providing a second layer of thermoplastic material in the form of a sheet or a film which is at least partially melted, wherein the second layer of thermoplastic material is provided by melting and pressing thermoplastic material into a sheet or film using nip rollers;
   applying the at least partially melted second layer directly onto the reinforcement sheet at a side of the reinforcement sheet facing away from the first layer;
   adhering the at least partially melted first layer, the at least partially melted second layer and the reinforcement sheet to each other by pressing them together at a second pressure that is lower than the first pressure so as to form a reinforced laminate; and
   applying, on the second layer, a printed decoration layer and a protection layer covering the printed decoration layer to form the panel;
   wherein the at least partially melted first layer, the at least partially melted second layer and the reinforcement sheet are pressed together using calendering rolls so that the reinforced laminate has a smooth upper surface.

2. The method according to claim 1, wherein the method is performed as a continuous process.

3. The method according to claim 1, wherein the reinforcement sheet comprises a glass fiber foil having a basis weight of 25-70 g/m².

4. The method according to claim 1, wherein, the thermoplastic materials of the first layer and the second layer are the same.

5. The method according to claim 1, wherein the reinforcement sheet is placed on top of the first layer before pressing them together.

6. The method according to claim 1, wherein the first layer of thermoplastic material is made of semi rigid PVC containing at least 35% of inorganic fillers.

7. The method according to claim 1, wherein the thermoplastic material of the first layer is provided in the form of granules having a cylindrical shape with a cylinder diameter in the range of 2.5-3.5 mm and a cylinder height in the range of 0.2-2.0 mm.

8. The method according to claim 7, wherein the cylinder height is approximately 0.5 mm.

9. The method according to claim 1, wherein the first pressure and a rate of melting the thermoplastic material of the first layer during the step of at least partially melting the first layer of thermoplastic material are selected such that the reinforcement sheet is impregnated by the thermoplastic material of the first layer over at least 80% of its thickness.

10. The method according to claim 1, wherein the adhered reinforcement sheet and first layer are cooled before the at least partially melted second layer of thermoplastic material is applied onto the reinforcement sheet.

11. The method according to claim 1, wherein the panel has a thickness which is between 1.5 and 5 mm.

12. The method according to claim 1, wherein the second layer of thermoplastic material is provided in the form of a sheet.

13. A method for manufacturing a panel including a reinforcement sheet, comprising:
   providing a first layer of thermoplastic material in the form of granules;
   providing a reinforcement sheet having a thickness;
   combining the reinforcement sheet and the first layer by laying the reinforcement sheet on the first layer, or alternatively, by performing the step of providing the first layer of thermoplastic material by applying the thermoplastic material of the first layer onto the reinforcement sheet;
   after the step of combining the reinforcement sheet and the first layer, at least partially melting the first layer of thermoplastic material in a double belt press and pressing the at least partially melted first layer of thermoplastic material and the reinforcement sheet together at a first pressure to adhere the reinforcement sheet and the first layer to each other, wherein the reinforcement sheet directly engages a press element during the step of pressing at the first pressure;
   after adhering the reinforcement sheet and the first layer to each other,
   providing a second layer of thermoplastic material in the form of a sheet or a film which is at least partially melted, wherein the second layer of thermoplastic material is provided by melting and pressing thermoplastic material into a sheet or film using nip rollers;
   applying the at least partially melted second layer directly onto the reinforcement sheet at a side of the reinforcement sheet facing away from the first layer;
   adhering the at least partially melted first layer, the at least partially melted second layer and the reinforcement sheet to each other by pressing them together to form a reinforced laminate; and
   applying, on the second layer, a printed decoration layer and a protection layer covering the printed decoration layer; to form the panel;
   wherein the at least partially melted first layer, the at least partially melted second layer and the reinforcement sheet are pressed together using calendering rolls so that the reinforced laminate has a smooth upper surface.

14. A method for manufacturing a substrate including a reinforcement sheet for a floor panel, comprising:
   providing a first layer of thermoplastic material in the form of granules;

providing a reinforcement sheet having a thickness;
combining the reinforcement sheet and the first layer by laying the reinforcement sheet on the first layer, or alternatively, by performing the step of providing the first layer of thermoplastic material by applying the thermoplastic material of the first layer onto the reinforcement sheet;
after the step of combining the reinforcement sheet and the first layer, at least partially melting the entirety of the first layer of thermoplastic material in double belt press and pressing the at least partially melted first layer of thermoplastic material and the reinforcement sheet together at a first pressure to adhere the reinforcement sheet and the first layer to each other, wherein the reinforcement sheet directly engages a press element during the step of pressing at the first pressure;
after adhering the reinforcement sheet and the first layer to each other,
providing a second layer of thermoplastic material in the form of a sheet or a film which is at least partially melted, wherein the second layer of thermoplastic material is provided by melting and pressing thermoplastic material into a sheet or film using nip rollers;
applying the at least partially melted second layer directly onto the reinforcement sheet at a side of the reinforcement sheet facing away from the first layer; and
adhering the at least partially melted first layer, the at least partially melted second layer and the reinforcement sheet to each other by pressing them together at a second pressure that is lower than the first pressure to form the substrate,
wherein the at least partially melted first layer, the at least partially melted second layer and the reinforcement sheet are pressed together using calendering rolls so that the substrate has a smooth upper surface.

15. The method of claim 14, wherein the reinforcement sheet is placed on top of the first layer before pressing them together.

* * * * *